United States Patent

Liaw

[11] Patent Number: 4,990,039
[45] Date of Patent: Feb. 5, 1991

[54] STRUCTURE OF VERTICAL MILLING MACHINE RAM ADAPTER

[76] Inventor: Y. T. Liaw, No. 48, Lane 450, Bei Yang Rd., Feng Yuan, Taiwan

[21] Appl. No.: 437,734

[22] Filed: Nov. 17, 1989

[51] Int. Cl.⁵ .................................................. B23C 1/12
[52] U.S. Cl. ..................................... 409/201; 409/211
[58] Field of Search ............... 409/201, 204, 211, 212, 409/216, 230; 29/39, 35.5, 47, 48.5 R, 48.5 A, 46; 51/166 T

[56] References Cited

U.S. PATENT DOCUMENTS

| Re. 31,288 | 6/1983 | Matsuzaki | 409/213 |
| 2,499,842 | 3/1950 | Armitage | 409/201 |
| 2,930,291 | 3/1960 | Bannow et al. | 409/216 |
| 3,232,171 | 2/1966 | Hengehold | 409/211 |
| 3,460,435 | 8/1969 | Hucksell | 409/230 |
| 3,577,828 | 5/1971 | Stickney | 409/216 |

*Primary Examiner*—William Briggs
*Attorney, Agent, or Firm*—Morton J. Rosenberg; David I. Klein

[57] ABSTRACT

This invention is related to a vertical milling machine ram adapter and particularly to one which has a U-shaped body with revolving mechanism set at both lateral sides and the front end to permit the connected milling head ram to make rotation along vertical axis as well as horizontal axis against the overarm of the milling machine so as to perform complicated milling process. The revolving mechanism is comprised of an adapter locking bolt and a circular groove, which adapter locking bolt is inserted through the ram adapter to connect the ram adapter to the overarm or the milling head ram of the milling machine.

3 Claims, 7 Drawing Sheets

STRUCTURE OF VERTICAL MILLING MACHINE RAM ADAPTER

BACKGROUND OF THE INVENTION

The present invention is related to a vertical milling machine ram adapter to connect a milling head ram to the overarm of a milling machine.

Milling machine are one of the most useful machine tools to mill parts and accessories into any shape, for example, into flat plane, bevel face, irregular plane, groove, tooth bearing and cam wheel, or to perform thread cutting, drilling, boring or shearing process. In order to maximize the performance, a variety of accessories are equipped with the milling machine. A ram adapter is common accessory used in milling machine. It helps to cur the milling head within a vertical plane and a horizontal) plane to flexibly perform milling process in any angle.

In a conventional ram adapter (1), as shown in FIG. 1, locking bolts (11) and adapter pivot stud (12) are used to insert from one side (21) of the overarm (2) through the ram adapter (1) into the other side (22) to become locked up by means of a locknut (13). This connection method is not very practical, and the following problems maY be encountered during milling process. <1> The turning range of the ram adapter is limited to an angle of 90°, that is 45° in one side. <2> Because the curved locking bolt holes (111) must be equilaterallY disposed, they are difficult to process. Further it takes more time to process such deep holes. <3> The locking bolts (11) provide low binding power and are easy to wear. Because the locking bolts (11) must completely penetrate through the adapter (1), the bearing force of the locking bolts is reduced in right proportion to the length of the locking bolts extended. However, to obtain a better performance it is better to extend the turning range of the ram adapter.

DETAILED DESCRIPTION OF THE PREFERRED EMBODIMENT

Figure 1:
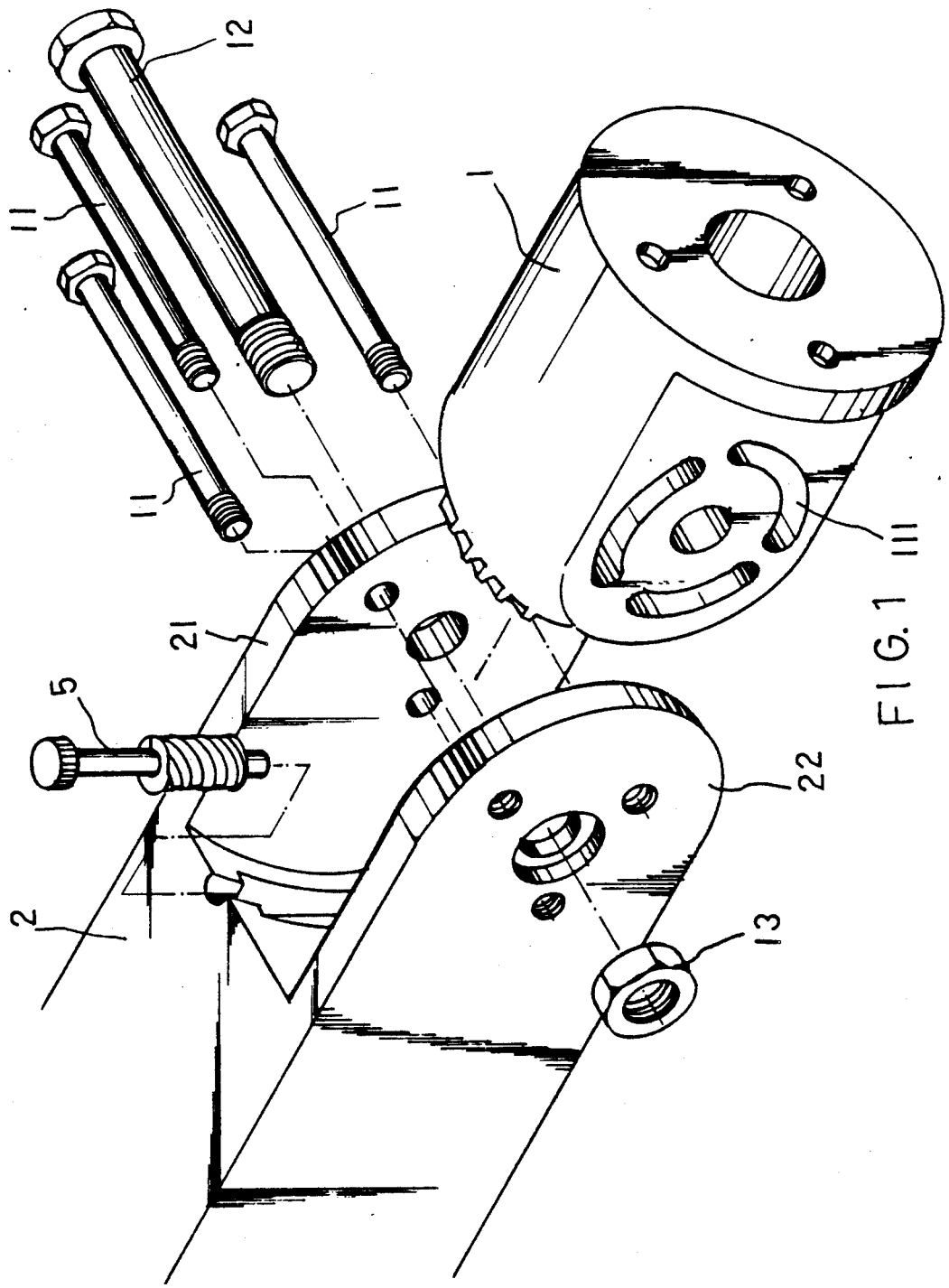
FIG. 1 is a perspective fragmentary view of the prior art.
Figure 2:
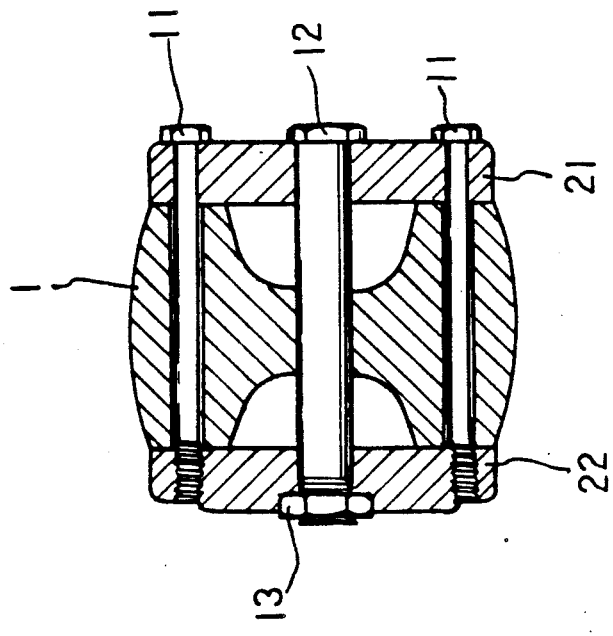
FIG. 2 is a cross sectional view of the prior art.
Figure 3:
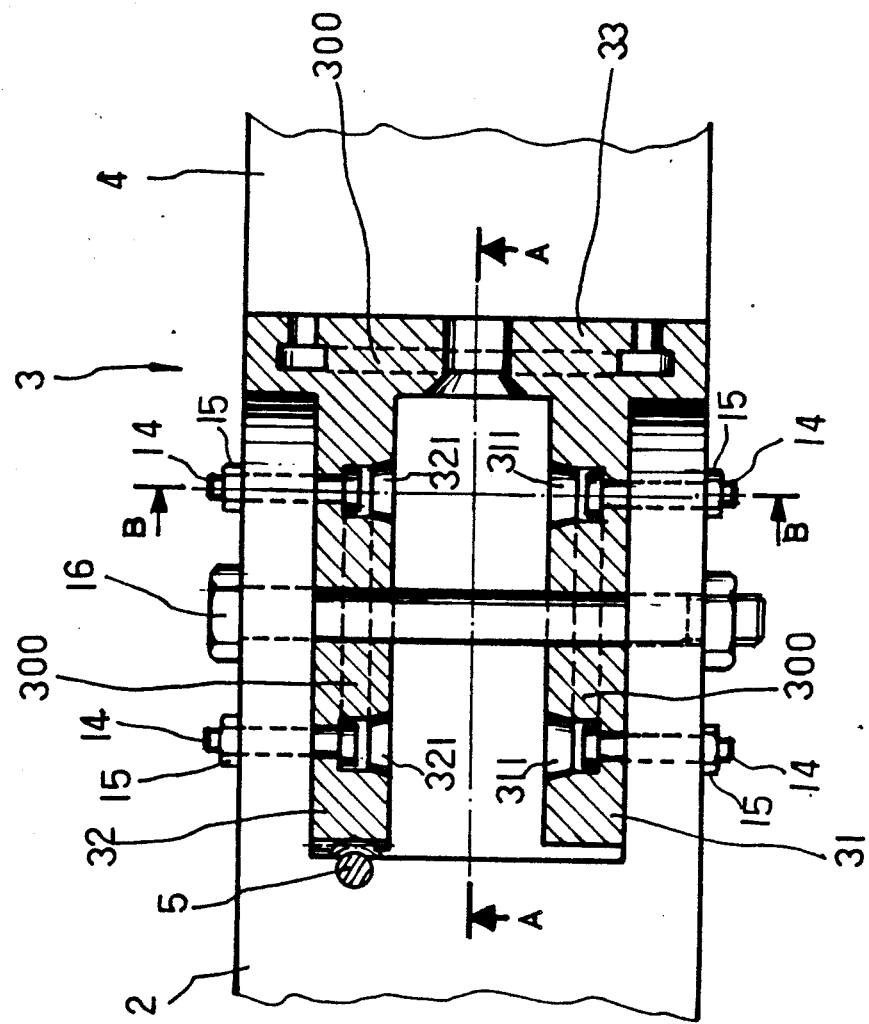
FIG. 3 is a sectional view of the present invention.
Figure 4:
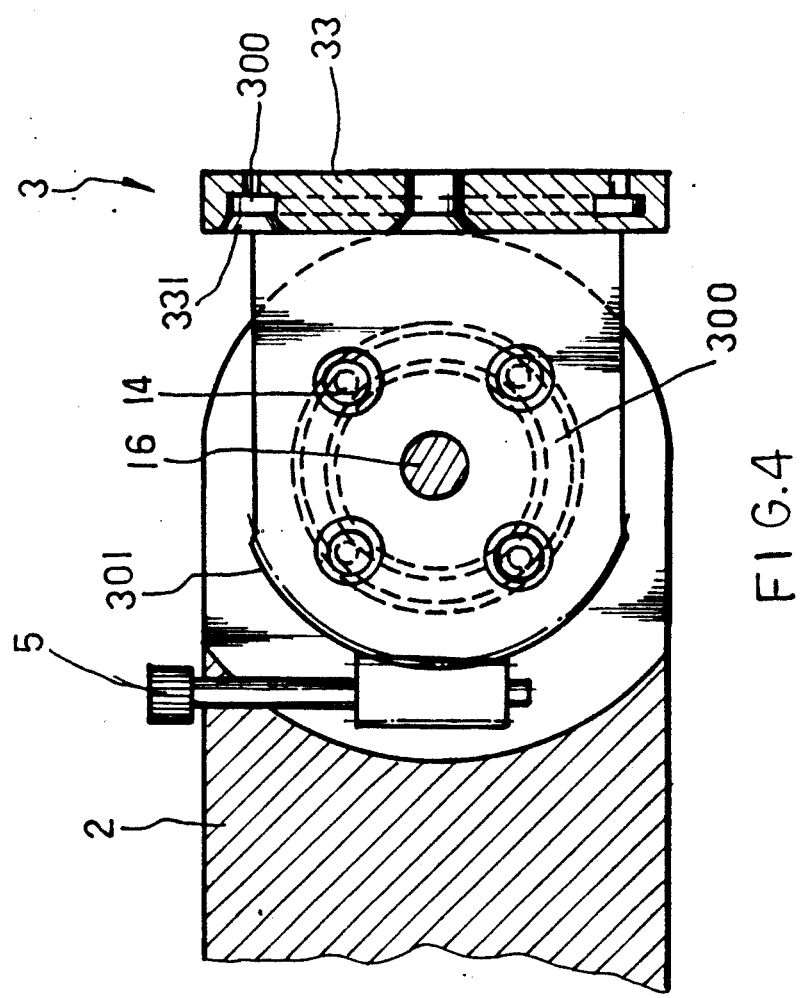
FIG. 4 is a sectional view taken on line A-A of FIG. 3.
Figure 5:
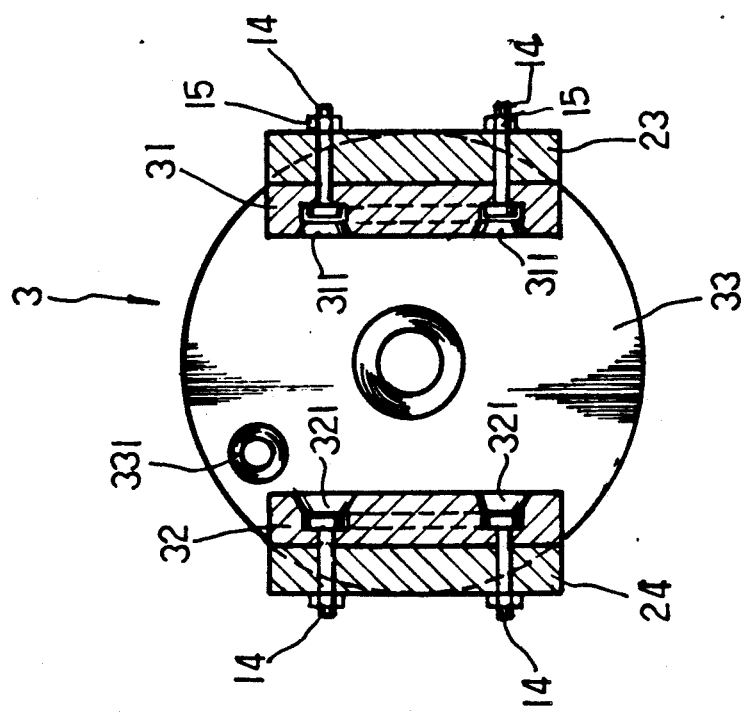
FIG. 5 is a sectional view taken on line B-B of FIG. 3.
Figure 6:
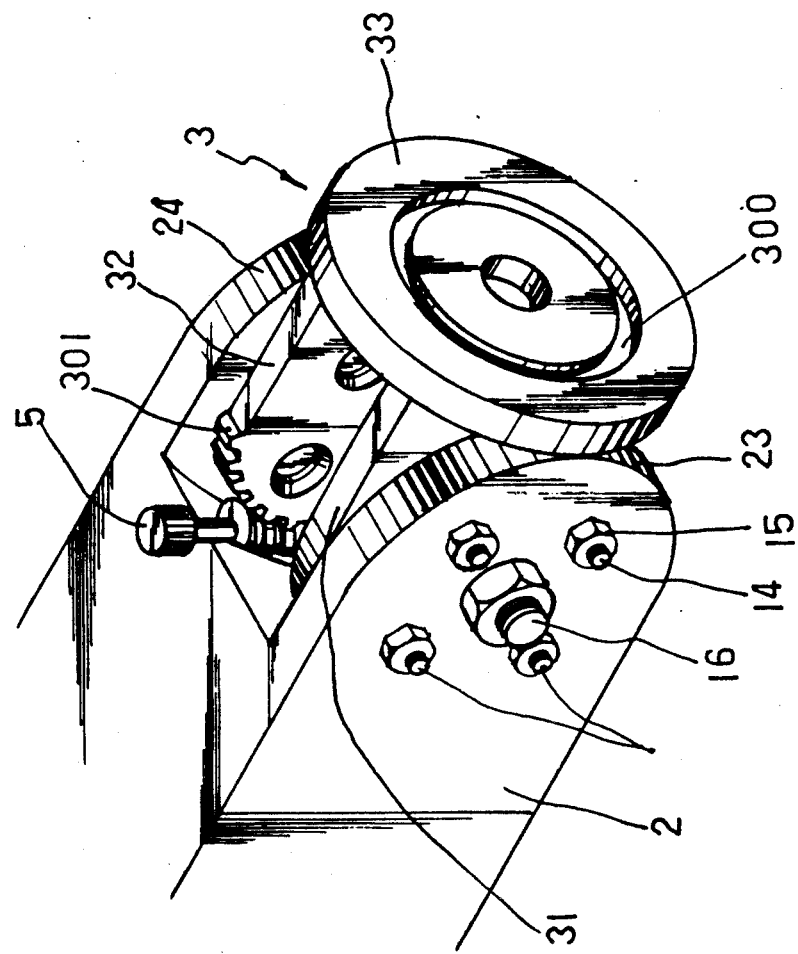
FIG. 6 is a perspective assembly view of the present invention.
Figure 7:
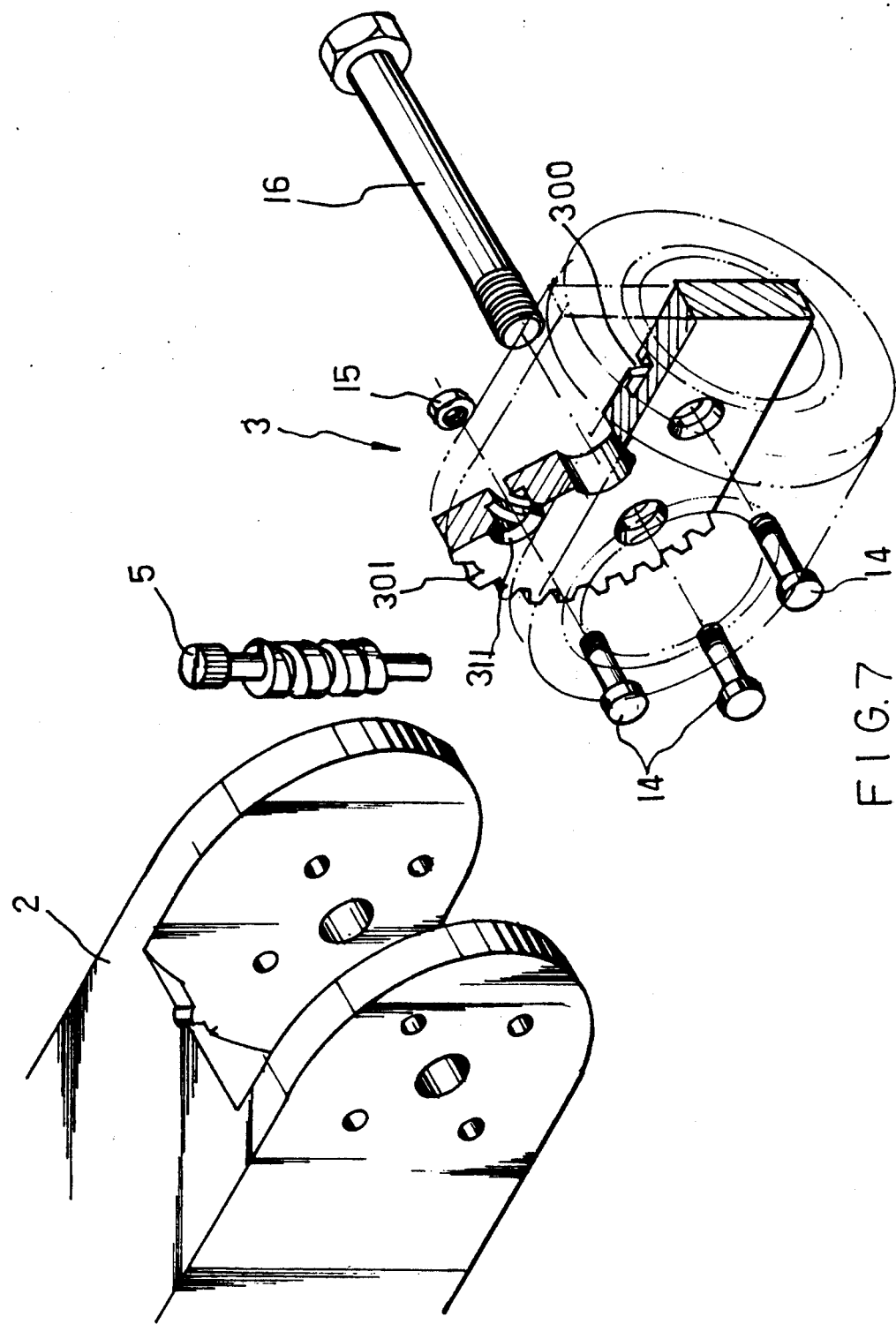
FIG. 7 is a perspective fragmentary view with partly sectional view of the present invention.

Referring to FIGS. 3 through 7, a ram adapter (3) is provided having one end connected to an overarm (2) of a milling machine by means of a plurality of adapter locking bolts (14) and an adapter pivot stud (16), and having the other end connected to a miliing head ram (4), wherein the milling head ram (4) is allowed to move within a horizontal and a vertical plane to perform a complicated milling process.

The ram adapter (3) is a cylindrical hollow body having both lateral side walls respectively processed into fiat plates (31) and (32) to match with the bilateral protruding plates (23) and (24) of the overarm (2), and having the back end, which is in contact with :he overarm (2), formed into a circular face, and also having the front end formed into a front plate (33), wherein the two lateral plates (31) and (32) each have four tapered holes and a circular groove (300) formed therein. The front plate (33) has a circular groove (300) and a tapered hole (331) formed therein; The right side plate (32) of the ram adapter (3) has a tooth surface (301) formed at the back end.

When assembled, adapter locking bolts (14) are respectively inserted from the inner side of the hollow body of the ram adapter (3) through the tapered holes of the lateral plates (31) or (32) into the tapered holes of the protruding plates (23) or (24) of the overarm (2) to become engaged up with respective locknuts. An adapter pivot stud (16) is inserted through both lateral plates (31) and (32) of the ram adapter (3) and both protruding planes (23) and (24) of the overarm (3) for engagement with a locknut. The adapter locking bolts (14) are respectively arranged to slide along the circular grooves (300) of the ram adapter (3), that is the ram adapter (3) is permitted to turn against the adapter locking bolts (14). The turning angle of the ram adapter (3) is controlled by a vertical adjusting worm (5) which is engaged with the tooth face (301) of the right side plate (32).

In the same manner, the ram adapter (3) is connected by its front plate (33) to the milling head ram (4) to let the milling head ram (4) turn round along the circular groove (300) of the front plate (33).

As described above, the main feature of the present invention is the use of adapter locking bolts (14) to mate with circular groove (300) for movable connection. According to the present invention, following advantages can be achieved: <1> High biding power, about 2.5 times over the prior art. <2> Theoretically no limitation in the angle of rotation. For safety's sake, the angle of rotation within 120° is efficiently achieved. <3> Easy to manufacture and install. <4> Adapter locking bolts are minimized in size to provide maximum bearing force.

In conclusion, the present invention is to provide such a ram adapter having numerous features each of Which tends to make the structure more practical for use in milling machine so as to help improving the performance and extending the life of the associated milling machine.

What is claimed is:

1. A vertical milling machine ram adapter, comprising:

a cylindrical hollow body having a front plate integrally formed with a pair of lateral side walls, each of said side walls being defined by a respective lateral flat plate, each of said lateral flat plates having (1) a circular face formed on a rear end portion thereof, and (2) a front end portion coupled to said front plate, wherein said two lateral flat plates and a said front plate are formed in a U-shaped configuration with each of said lateral flat plates and said front plate having a circular groove formed therein and at least one tapered hole formed therethrough, said tapered hole being in open communication with said circular groove, one of said lateral flat plates having an arcuate tooth surface formed on said rear end portion and disposed in mating relationship with an adjustment worm gear for control of a revolving angle of he ram adapter.

2. The vertical milling machine ram adapter as set forth in claim 1, wherein each of said lateral flat plates has four tapered holes formed therethrough and in open communication with said circular groove, whereby each of said tapered holes receives one of four adapter locking bolts for passage into said circular groove wherein said adapter locking bolts are slidably engaged for adjustably coupling said ram adapter to an overarm of an associated milling machine.

3. The vertical milling machine ram adapter as set forth in claim 1, wherein said front plate has a singular tapered hole formed therethrough and in open communication with said circular groove, wherein an adapter locking bolt passes into said circular groove for slidable engagement with said front plate to adjustably coupled said ram adapter to a milling head ram.

* * * * *